(12) United States Patent
Anabuki et al.

(10) Patent No.: US 7,298,384 B2
(45) Date of Patent: Nov. 20, 2007

(54) MIXED REALITY PRESENTING APPARATUS AND IMAGE PROCESSING METHOD

(75) Inventors: Mahoro Anabuki, Kanagawa (JP); Hiroyuki Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1075 days.

(21) Appl. No.: 10/341,423

(22) Filed: Jan. 14, 2003

(65) Prior Publication Data
US 2003/0137524 A1 Jul. 24, 2003

(30) Foreign Application Priority Data
Jan. 22, 2002 (JP) ............................. 2002-012795

(51) Int. Cl.
*G09G 5/00* (2006.01)

(52) U.S. Cl. ...................... 345/633; 345/619; 345/632

(58) Field of Classification Search ................ 345/629, 345/633
See application file for complete search history.

(56) References Cited

U.S. PATENT DOCUMENTS

| | | | | |
|---|---|---|---|---|
| 5,252,141 A | | 10/1993 | Inoue et al. | ................ 136/251 |
| 5,279,679 A | | 1/1994 | Murakami et al. | ........... 136/246 |
| 5,673,082 A | * | 9/1997 | Wells et al. | ................ 348/139 |
| 5,815,411 A | * | 9/1998 | Ellenby et al. | ............... 702/150 |
| 6,239,915 B1 | * | 5/2001 | Takagi et al. | ................ 359/629 |
| 7,119,831 B2 | * | 10/2006 | Ohto et al. | .................. 348/135 |
| 2002/0057280 A1 | | 5/2002 | Anabuki et al. | ............ 345/633 |
| 2002/0095265 A1 | | 7/2002 | Satoh et al. | ................... 702/94 |

OTHER PUBLICATIONS

Azuma et al., Improving Static and Dynamic Registration in an Optical See-through HMD, ACM SIGGRAPH, 1994, pp. 197-204 and Appendices A-F.*
Azuma, A Survey of Augmented Reality, In Presence: Teleoperatos and Virtual Environments Aug. 6, 1997, pp. 1-48.*
Ryugo Kijima, et al., "-ReflexHMD- Development of HMD having Vestibule Reflecting Function", TVRSJ, vol. 6, No. 2, pp. 107-114 (2001).

* cited by examiner

*Primary Examiner*—Kee M. Tung
*Assistant Examiner*—Motilewa Good-Johnson
(74) *Attorney, Agent, or Firm*—Fitzpatrick, Cella, Harper & Scinto

(57) ABSTRACT

A mixed reality presenting apparatus for merging an incident real-space image and a generated virtual-space image comprises a measuring section which measures the orientation of a unit for entering the real-space image and the speed or acceleration thereof; a virtual-space image generating section which generates virtual-space image data on the basis of the measurement result; a correcting optical system which corrects the path of light passing therethrough; and a correcting optical system control section which controls the correcting optical system on the basis of the measured speed or acceleration.

7 Claims, 9 Drawing Sheets

MIXED REALITY PRESENTING APPARATUS AND IMAGE PROCESSING METHOD

BACKGROUND OF THE INVENTION

1. Field of the Invention

The present invention relates to prevention of registration error of a real-space image and a virtual-space image, which is caused when combining the virtual-space image with the real-space image.

2. Description of the Related Art

Recently, studies on mixed reality (hereinafter abbreviated as "MR") carried out to achieve seamless mixture of a real space and a virtual space are more active than ever.

The aim of MR is to achieve coexistence of a virtual-reality (hereinafter abbreviated as "VR") world, which is conventionally capable of being experienced in circumstances separated from the real space, and the real space. MR has attracted attention as a technique for improving VR.

Expected applications of MR include new areas quite different in quality from those of conventional VR, such as medical assisting applications, in which a view of the inside of a body is presented to a physician, and work assisting applications in which an assembly procedure for a product overlaid on an actual article in a factory.

A common requirement for these application is a technique for eliminating a "registration error" of the real space and the virtual space. One registration error is a dynamic registration error caused by a time lag produced between a displacement of an MR presenting apparatus and reflection of that displacement in the display of the virtual-space image. Elimination of this registration error (hereinafter referred to as a "dynamic registration error") is a problem to be solved by the present invention. This will be described in detail.

Figure 1:
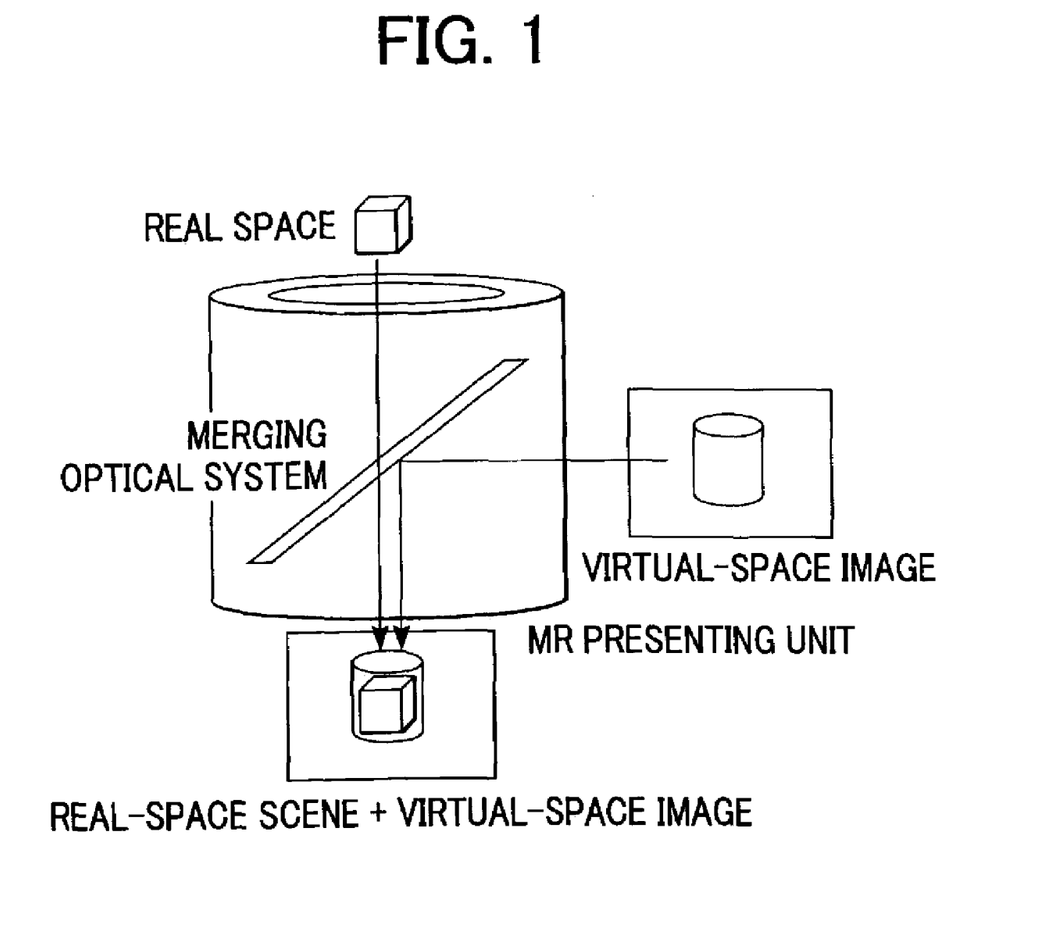
FIG. 1 illustrates the configuration of an optical see-through type MR presenting apparatus.
Figure 2:
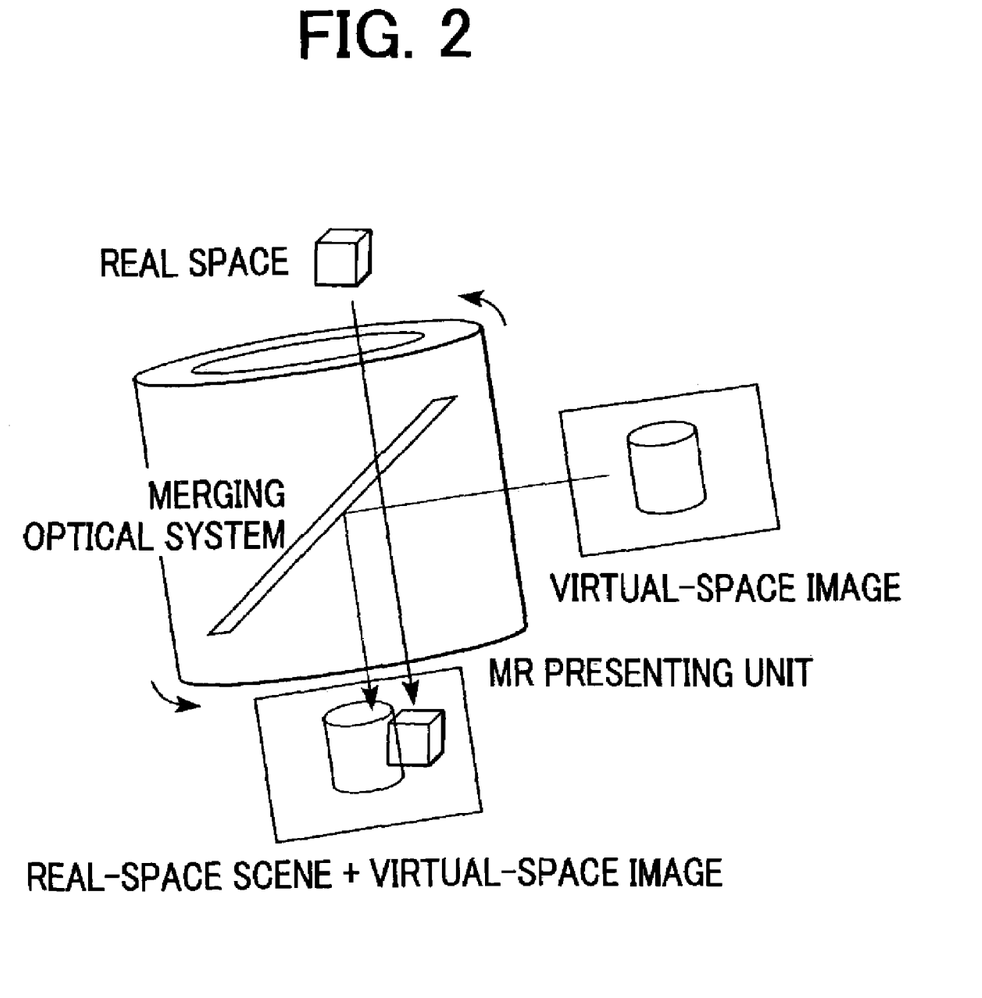
FIG. 2 illustrates the configuration of a "dynamic registration error".

The MR presenting apparatus measures the position and orientation of a viewpoint for observation of the real space, generates virtual-space image data on the basis of the measurement result, merging a virtual-space image formed by visualizing the generated data and a real-space scene, and displays the merged image. In this method, known as "optical see-through", the merging is accomplished by means of an optical system such as a half mirror. FIG. 1 illustrates this configuration. It takes time to go through the process from measuring of the position and orientation of the viewpoint to displaying the virtual-space image. When the viewpoint of the observer moves, therefore, the position and orientation of the viewpoint upon looking at the real-space scene would differ from the position and orientation of the observer's viewpoint measured upon generating data for the virtual-space image to be merged with the scene. Merging the real-space scene and the virtual-space image, which have viewpoints with different positions and orientations from each other, produces a registration error of the two images. This is the "dynamic registration error". FIG. 2 illustrates the occurrence of such a registration error.

Efforts have been made to eliminate the registration error described above.

For example, there is proposed a method for eliminating the "dynamic registration error" of a real-space and a virtual space by moving the display area of a virtual space image in line with movement of the apparatus. The paper "—Reflex-HMD—Development of HMD having Vestibule Reflecting Function" (Ryugo KIJIMA, et al., TVRSJ, Vol. 6, No. 2, pp. 107-114, 2001) discloses a method of preparing in-advance virtual-space image data for an area larger than the HMD field of view, cutting an area corresponding to a real-space image based on measured data of the rotation angular velocity data of the HMD as measured by a gyro-sensor from the thus prepared data, displaying the cut area, and merging the same with the real-space scene. This method is effective for eliminating a "dynamic registration error".

However, the above-mentioned method causes a problem in that it requires a lot of time for processing because of the necessity to generate virtual space image data for an area larger than the field of view. For merging a real space and a virtual space, a process known as "video see-through" is known. This process includes electrically merging, in a merging apparatus such as a computer, a virtual-space image with a real-space image captured in real-time by means of a camera or the like. The above-mentioned method is not applicable to this process, however.

SUMMARY OF THE INVENTION

The present invention was developed in view of the circumstances described above, and has as an object to the elimination of a registration error caused by a time lag produced before reflection of the movement of a mixed reality presenting apparatus, which merges a virtual-space image with a real-space imaged captured in real-time, in the display of the virtual-space image.

To achieve the aforementioned object, the present invention features the following configurations.

A first aspect of the invention provides a mixed reality presenting apparatus for merging an incident real-space image and a generated virtual-space image, comprising a measuring section which measures the orientation of a unit for inputting the real-space image and the speed or acceleration thereof; a virtual-space image generating section which generates virtual space image data on the basis of the measurement result, a corresponding optical system which corrects path of light passing therethrough; and a correcting optical system control section which controls the correcting optical system on the basis of the measured speed or acceleration.

Another aspect of the present invention provides an image processing method comprising the steps of determining the orientation of an apparatus into which a real-space image and the speed or acceleration thereof; generating virtual space image data on the basis of the measurement result; and merging the real-space image incident in real-time and the generated virtual space image, and inhibiting a registration error of the incident real-space image and the generated virtual-space image caused by a time lag in generating the virtual space image by controlling a correcting optical system which corrects the path of light passing therethrough on the basis of the measured speed or acceleration.

Still another aspect of the present invention provides a mixed reality presenting apparatus for merging an incident real-space image and a generated virtual-space image, comprising a measuring section which measures the position of a viewpoint and the speed or acceleration for detecting the position of the incident real-space image; a virtual space image generating section which generates the virtual space image in response to the measured position; a correcting optical system which corrects the path of a light passing therethrough; a control section which controls the correcting optical system in response to the measured speed or acceleration; and a merging section which merges the virtual-space image generated by the virtual space image generating section with the incident real-space image via the correcting optical system controlled by the control section.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described with reference to the attached drawings.

First Embodiment

The first embodiment of the invention is an application of the invention to a telescopic MR presenting apparatus. The telescopic MR presenting apparatus, in which a telescope portion comprises an MR presenting apparatus, is for enabling a user of this apparatus (hereinafter referred to as an "observer") to merge a virtual-space image with a real-space scene by looking through the MR presenting apparatus. The observer looks at an image formed by overlaying the virtual-space image on the real-space scene while moving the MR presenting apparatus.

Figure 3:
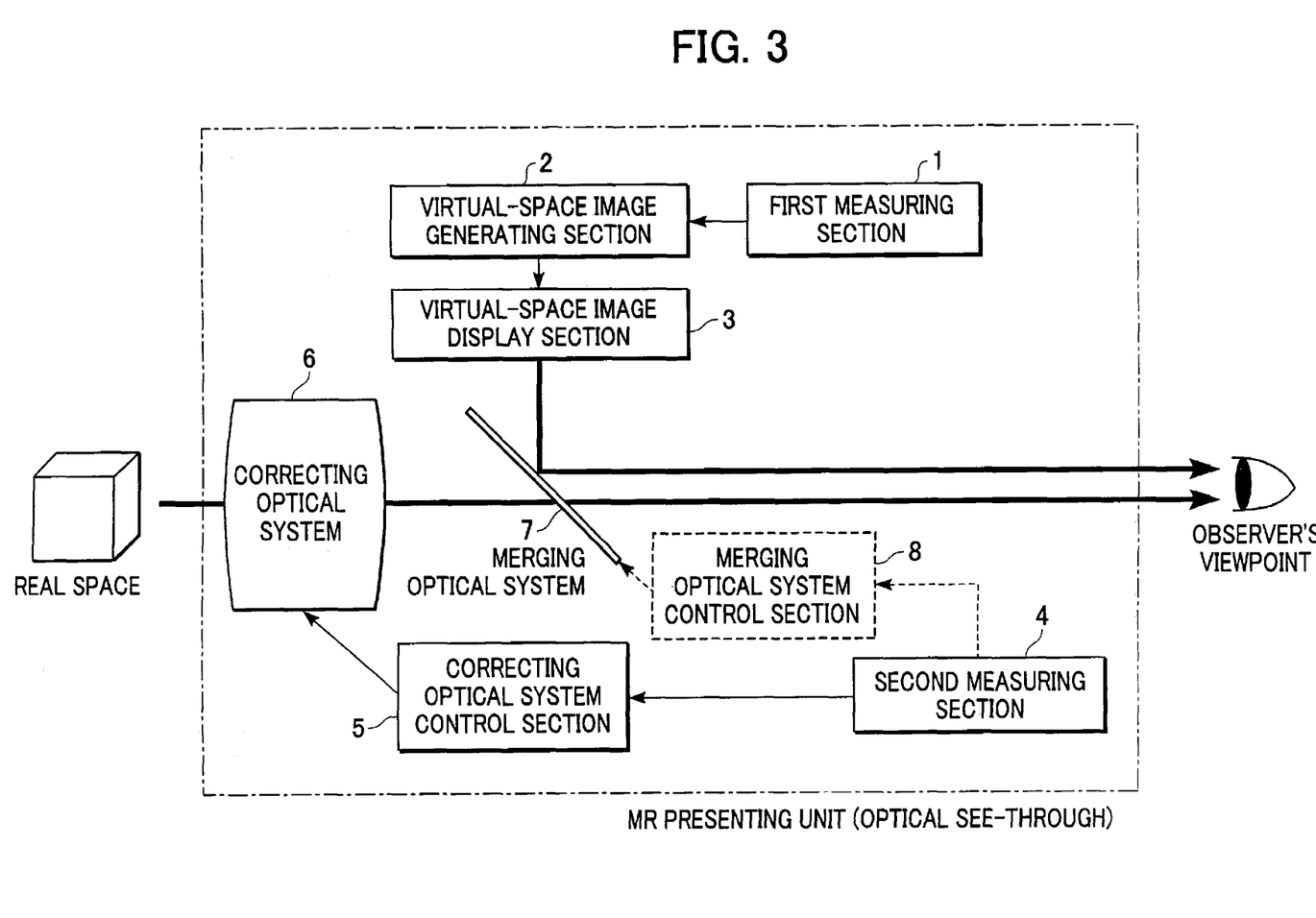
FIG. 3 is a block diagram illustrating a schematic configuration of an MR presenting apparatus of a first embodiment of the present invention.

The MR presenting apparatus of the first embodiment of the invention is of the optical see-through type. FIG. 3 is a block diagram illustrating a schematic configuration of the MR presenting apparatus of the first embodiment of the invention.

Reference numeral 1 represents a first measuring section, comprising, for example, a magnetic sensor (formed of a magnetic transmitter fixed in the real space and a magnetic tracker attached to the MR presenting apparatus). The first measuring section 1 measures the position and orientation of the MR presenting apparatus in the real space and outputs the measured data to a virtual-space image generating section 2. The first measuring section 1 may comprise a gyro-sensor or the like, to measure only the orientation of the MR presenting apparatus in the real space and output the measured data to the virtual-space image generating section 2.

Reference numeral 2 represents the virtual-space image generating section which comprises a computer or the like. The virtual-space image generating section 2 calculates position data and orientation data of the observer's viewpoint in the real space from the position data and the orientation data of the MR presenting apparatus received from the first measuring section 1. For example, on the assumption that, when using the MR presenting apparatus, the observer looks into an eyepiece (not shown) of the telescope portion in the apparatus, the position and orientation of the eyepiece are deemed to be the position and orientation of the observer's viewpoint. In this case, the position data and the orientation data of the MR presenting apparatus measured by the measuring section 1 are converted by the virtual space image generating section 2 into position data and orientation data of the eyepiece, and the result of the conversion is treated thereafter as position data and orientation data of the observer's viewpoint. Then, the virtual-space image generating section 2 generates virtual-space image data in response to the calculated position data and orientation data of the observer's viewpoint. When receiving only the posture data of the MR presenting apparatus from the first measuring section 1, position data and orientation data of the observer's viewpoint in the real space are calculated from the predetermined position data of the MR presenting apparatus and the received orientation data, and virtual-space image data corresponding to these data is generated. These virtual-space data will be merged with a scene in the real space observed by means of the MR presenting apparatus, including, for example, character information explaining the scene being observed, or image data simulating a scene in which virtual buildings are formed in the scene opening out before the user. The generated image data are sent to the virtual-space image display section 3.

Reference numeral 3 represents a virtual-space image display section comprising a liquid crystal panel or the like. The virtual-space image display section 3 displays the virtual-space image data received from the virtual-space image generating section 2 in the form of an image. The light from the displayed image enters a combining optical system 7.

Reference numeral 4 represents a second measuring section comprising an acceleration sensor or a gyro-sensor. The second measuring section 4 measures the speed or acceleration of the MR presenting apparatus in the real space and outputs the measurement result to a correcting optical system control section 5. When there is a combining optical system control section 8, the result of measurement is also output thereto. The second measuring section 4 may measure the parallel displacement speed, or may measure the rotation angular velocity, or measure both. The second measuring section 4 may measure the parallel displacement acceleration, or may measure the rotation angular acceleration, or may measure both. The second measuring section 4 may be identical to the first measuring section. In this case, the measuring section which measures the position and posture of the MR presenting apparatus simultaneously measures the speed or the acceleration of the MR presenting apparatus. The structure of the MR presenting apparatus is simpler.

Reference numeral 5 represents the correcting optical system control section comprising a microcomputer or the like. The correcting optical system control section 5 calculates an amount of control for the correcting optical system 6 from the speed data or the acceleration data of the MR presenting apparatus received from the second measuring section 4, and sends a control signal to the correcting optical system 6 on the basis of the thus calculated value.

Reference numeral 6 represents a correcting optical system comprising a variable angle prism or the like. The correcting optical system 6 causes refraction of the external light incident from the real space by deforming or moving in response to a control signal sent from the correcting optical system control section 5.

The second measuring section 4, the correcting optical system control section 5 and the correcting optical system 6 are applications of a vibration isolator attached to a regular blur-correcting image capture apparatus.

Reference numeral 7 represents the merging optical system comprising a half mirror or the like. The merging optical system 7 merges image light incident from the virtual-space image display section 3 and external light from the real space, which is incident through the correcting optical system 6, and makes the resultant merged light fall on the observer's viewpoint. When there is a merging optical system control section 8, it rotates or moves the combining optical system 7 to direct the merged light towards the observer's viewpoint on the basis of a control signal sent from the merging optical system control section 8.

Reference numeral 8 represents the synthesizing optical system control section comprising a microcomputer or the like. The merging optical system control section 8 calculates an amount of control for the merging optical system 6 from the speed data or acceleration data of the MR presenting apparatus received from the second measuring section 4, and sends a control signal to the merging optical system 7 on the basis of the thus calculated value. The merging optical system control section 8 is not necessary for the present invention.

Figure 4:
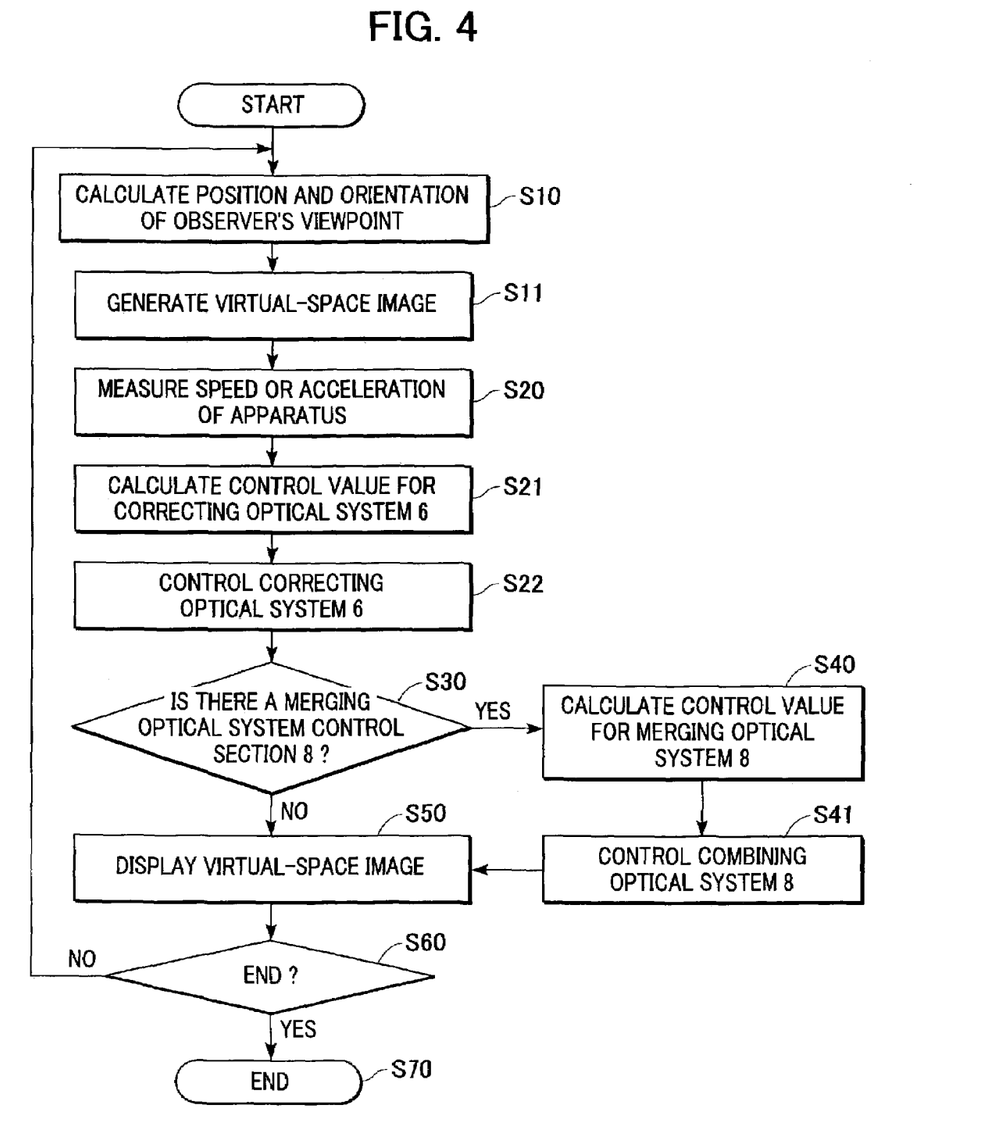
FIG. 4 is a flowchart illustrating the processing procedure of the first embodiment of the invention.

Control of this embodiment having the above-mentioned configuration will now be described. FIG. 4 is a flowchart illustrating the processing procedure in the first embodiment of the present invention.

In step S10, the first measuring section 1 measures the position and orientation, or only the orientation, of the MR presenting apparatus, and calculates position data and posture data of the observer's viewpoint from the measured data. When only the orientation is measured is the previously stored position data used as the position data of the observer's viewpoint.

In step S11, the virtual-space image generating section 2 receives the position data and the posture data of the observer's viewpoint from the first measuring section 1, and generates virtual-space image data in response to the received data.

In step S20, the second measuring section 4 measures the speed or acceleration of the MR presenting apparatus. The term "speed" as used herein means a parallel displacement speed, or an angular rotation speed, or both. The term "acceleration" as used herein means a parallel displacement acceleration, or an angular rotation acceleration, or both. For the parallel displacement speed and the parallel displacement acceleration, vertical components and horizontal components of the MR presenting apparatus are measured. For the angular rotation speed and the angular rotation acceleration, components around the vertical axis and around the horizontal axis of the MR presenting apparatus are measured.

In step S21, the correcting optical system control section 5 calculates an amount of control for the correcting optical system 6 from the speed data and the acceleration data of the MR presenting apparatus received from the second measuring section 4, and sends a control signal on the basis of the thus calculated value to the correcting optical system 6. The amount of control for the correcting optical system 6 is determined so as to eliminate a "dynamic registration error" of a real-space scene and a virtual-space image at the observer's viewpoint. This will be described in detail in the following paragraphs.

Figure 5:
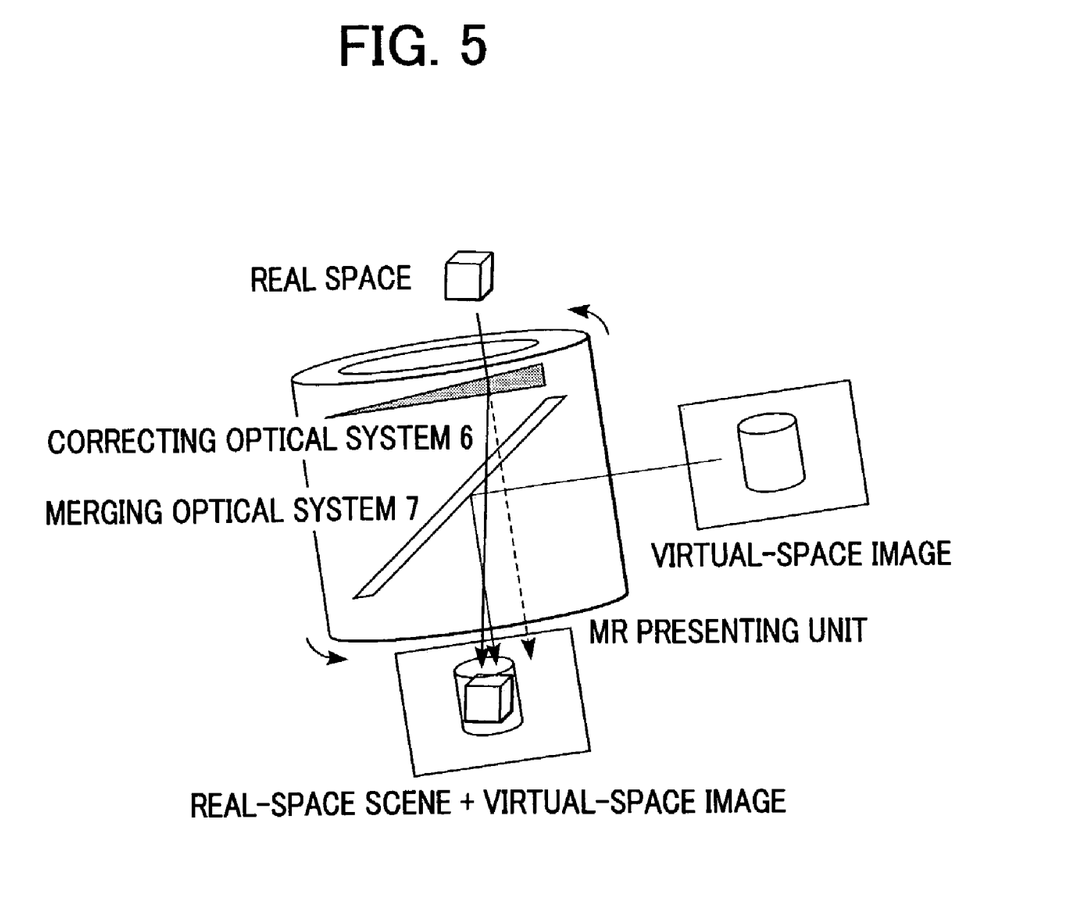
FIG. 5 illustrates a configuration in which a "dynamic registration error" is eliminated by the first embodiment of the invention.

When the MR presenting apparatus is moving, it takes some time for this movement to be reflected in the virtual-space image data generated by the virtual-space image generating section 2. This produces a registration error, as shown in FIG. 2, of the real-space scene and the virtual-space image at the observer's viewpoint. The correcting optical system 6 refracts the external light incident from the real space in the vertical and horizontal directions of the MR presenting apparatus so as to correct this registration error. If the refraction angle is correct, the "dynamic registration error" is eliminated, as shown in FIG. 5. The refraction angle depends upon the amount of change (amount of deformation or amount of displacement) of the correcting optical system 6. The amount of change of the correcting optical system 6 is controlled by the correcting optical system control section 5. The amount of control is determined in response to the speed or acceleration of the MR presenting apparatus measured by the second measuring section 4. For example, when the second measuring section 4 measures the angular rotation speed of the MR presenting apparatus, the correcting optical system control section 5 determines an amount of control so that the real-space scene is displaced by amounts calculated from the following formulae (1) and (2) at the observer's viewpoint:

$$Rx = L \times t1 \times \omega x \quad (1)$$

$$Ry = L \times t1 \times \omega y \quad (2)$$

where:

Rx: Amount of displacement of the real-space scene in the horizontal direction of the MR presenting apparatus;

Ry: Amount of displacement of the real-space scene in the vertical direction of the MR presenting apparatus;

L: Distance between the rotation center of the MR presenting apparatus and the observer's viewpoint, previously assumed;

$\omega x$: Angular rotation speed around the vertical axis of the MR presenting apparatus;

$\omega y$: Angular rotation speed around the horizontal axis of the MR presenting apparatus;

t1: Average time required from the moment of measurement of position and orientation of the MR presenting apparatus to the moment of display of the virtual-space image;

and where t1 is the sum of the time required from the start of measurement by the first measuring section to output of the measured data and the time required for generating the virtual-space image data by the virtual-space image generating section 2. The former is intrinsic to the first measuring section, and is substantially constant. The latter varies somewhat depending on the generated virtual-space image data.

Since $L \times t1$ is a constant in Formulae (1) and (2), calculation can be accomplished in a very short period of time. A "dynamic registration error" produced by the movement of the MR presenting apparatus during this processing is therefore substantially negligible. As a result, if the real-space scene moves by an amount derived from Formulae (1) and (2) from the observer's viewpoint, the "dynamic registration error" of the real-space scene and the virtual-space image can be eliminated.

The actual time required from the measurement of position and orientation of the observer's viewpoint by the first measuring section 1 up to display of the virtual-space image differs from the average time. Strictly speaking, displacement by an amount obtained from Formulae (1) and (2) is insufficient to completely eliminate the "dynamic registration error" of the real-space scene and the virtual-space image. This problem can be solved by minimizing the difference between the actual time and the average time thereof required during the period from the moment when the first measuring section 1 measures position and orientation of the observer's viewpoint to the moment when the virtual-space image is displayed.

An amount of control for the correcting optical system 6 has been determined from Formulae (1) and (2) in the above-mentioned case. Other formulae can however be used. For example, Formulae (1) and (2) may be used by defining t1 as the "actual time required for the period from the moment of measurement of position and orientation of the MR presenting apparatus to the point in time when the virtual-space image is displayed. As a result, the "dynamic registration error" of the real-space scene and the virtual-space image can be completely eliminated.

Formulae may be used in which $\omega x$ and $\omega y$ are expressed as $\omega x(t)$ and $\omega y(t)$, with the variable t representing time. Therefore "t1×$\omega x$" in Formula (1) and "t1×$\omega y$" in Formula (2) should be replaced by "$\int t1 \times \omega x(t)$" and "$\int t2 \times \omega y(t)$", respectively (the range of integration covers the period from measurement of the position and orientation of the MR presenting apparatus to the point in time when the virtual-space image is displayed, or the average time required during the period from measurement of the position and orientation of the MR presenting apparatus to the moment when the virtual-space image is displayed.

In step S22, the correcting optical system control section 6 varies (is deformed or displaced) with a control signal received from the correcting optical system control section 5. This change causes refraction of the external light incident from the real space.

The variation of the correcting optical system 6 in step S22 is an application of the anti-vibration technique applied to an image pickup device having a common blur-correcting function. For example, when the correcting optical system 6 comprises a variable angle prism, the prism apex angle is controlled in response to a control signal received from the correcting optical system control section 5. When the correcting optical system 6 comprises a group of lenses whose refraction angle varies with the position at which the light passes through the correcting optical system 6, the position of the correcting optical system 6 is controlled in response to a control signal received from the correcting optical system control section 5.

In step S30, the presence or absence of the merging optical system control section 8 is determined. In the absence of the combining optical system control section 8, the process advances to step S50.

Otherwise, in step S40, the combining optical system control section 8 calculates a value for the merging optical system 7 from speed data or acceleration data of the MR presenting apparatus received from the second measuring section 4, and sends a control signal to the merging optical system 7 on the basis of the thus calculated value. Control of the merging optical system 7 is carried out so as to adjust the path of external light incident from the real space after passing through the correcting optical system 6, and the image light incident from the virtual-space image display section 3 so that merged light of both is properly incident at the observer's viewpoint.

In step S41, the merging optical system 7 changes (rotation or movement) in response to a control signal received from the merging optical system control section 8.

In step S50, the virtual-space image display section 3 displays the virtual space image data in the form of an image. The light from the displayed image enters the merging optical system 7, and is projected towards the observer's viewpoint. Simultaneously, the external light, after entering from the real space and passed through the correcting optical system 6, is also incident on the merging optical system 7 and projected towards the observer's viewpoint. The resultant change of the correcting optical system 6 eliminates the "dynamic registration error" of the real-space scene and the virtual space image at the observer's viewpoint.

When the real-space scene and the virtual-space image are projected onto the observer's viewpoint, the real-space scene which should originally be incident perpendicularly to the observer's viewpoint is actually incident diagonally with respect to the observer's viewpoint because of the presence of the correcting optical system 6, resulting in a distorted image. By extending the optical path from the correcting optical system 6 to the observer's viewpoint, the refraction angle of the external light of the real space to be corrected becomes smaller, so that distortion of the real-space scene becomes negligible.

In step S60, it is checked whether or not operation of the apparatus is to be discontinued. Operation of the apparatus is discontinued by causing the system to terminate operation in step S70. When operation of the apparatus is not to be discontinued, the process goes back to step S10 and the above-mentioned processing is repeated.

The above-mentioned description of the first embodiment of the invention has covered a case where the invention is embodied as a telescope-type MR presenting apparatus. The apparatus of the invention may also be a head-mounted display type MR presenting apparatus.

Second Embodiment

Figure 6:
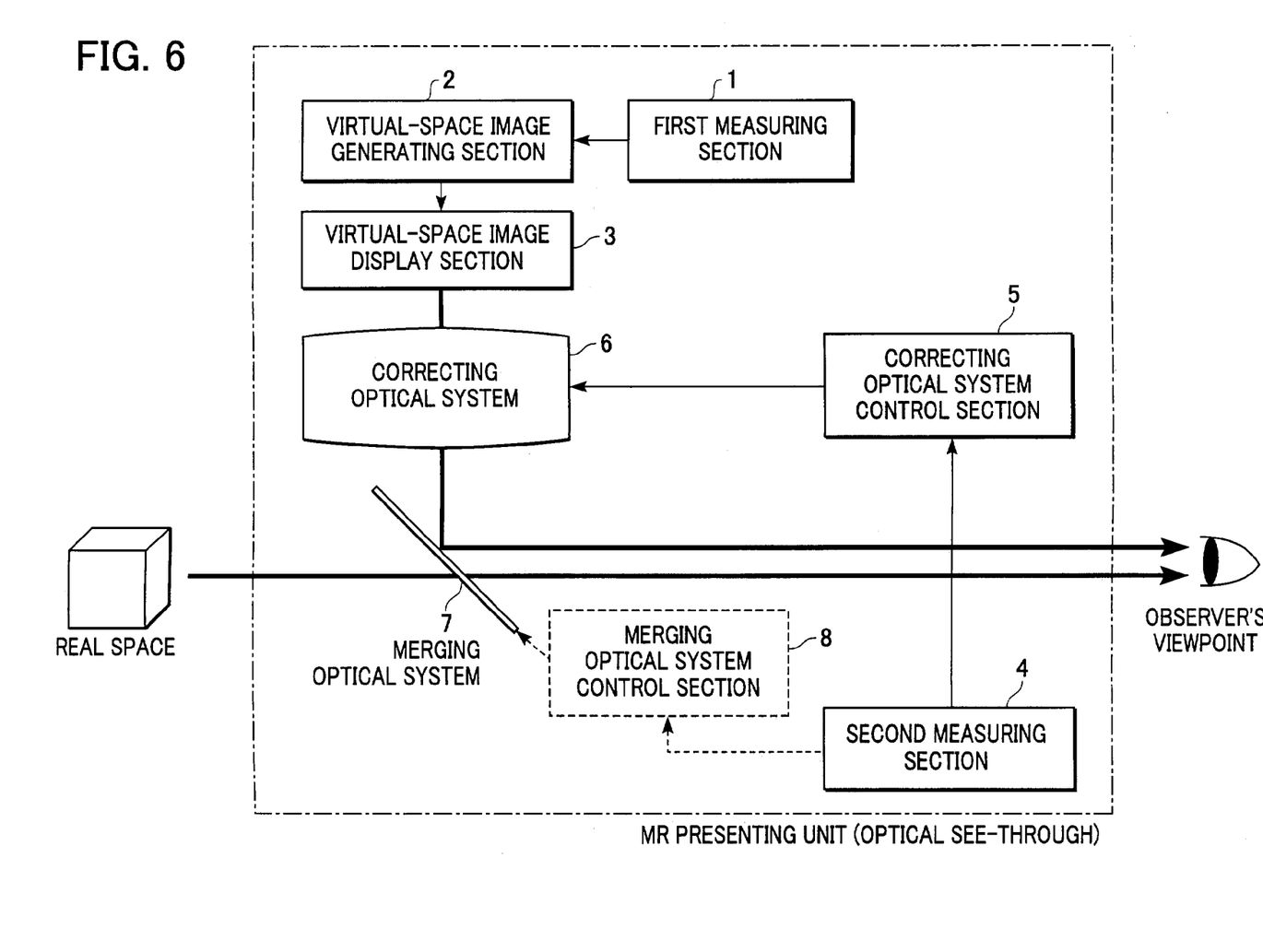
FIG. 6 is a block diagram illustrating a schematic configuration of an MR presenting apparatus of a second embodiment of the invention.

A second embodiment of the present invention will now be described. The second embodiment also covers an optical see-through type telescopic MR presenting apparatus. FIG. 6 is a block diagram illustrating a schematic configuration of the MR presenting apparatus in the second embodiment of the invention.

The second embodiment has the same configuration as that of the first embodiment, except for different operations of part of the configuration. The same reference numerals as in the MR presenting apparatus of the first embodiment are assigned to corresponding components, and only components of different operations from the first embodiment will be described.

Reference numeral 3 represents a virtual-space image display section which comprises a liquid crystal panel or the like. The virtual-space image display section 3 displays virtual-space image data received from the virtual space image generating section 2 in the form of an image. The light of this image is incident on the correcting optical system 6.

Reference numeral 6 represents the correcting optical system which comprises a variable angle prism or the like. The correcting optical system 6 causes refraction of the image light incident from the virtual space image display section 3 by deforming or moving in response to the control signal sent from the correcting optical system control section 5.

Reference numeral 7 represents a merging optical system which comprises a half mirror or the like. The merging optical system 7 merges the image light after passing through the correcting optical system 6 and incident from the virtual-space image display section 3 and the external light incident from the real space, and causes the resultant merged light to be incident on the observer's viewpoint. When a merging optical system control section 8 is provided, the merged light is made incident properly on the observer's viewpoint through rotation or movement on the basis of the control signal sent from the merging optical system control section 8.

Control of the second embodiment of the invention will now be described. The processing procedure in the second embodiment of the invention is quite the same as that in the first embodiment. Only portions different in processing details will be described. The reference numerals correspond to those shown in the flowchart illustrating the processing procedure in the first embodiment of the invention shown in FIG. 4.

In step S21, the correcting optical system control section 5 calculates the amount of control for the correcting optical system 6 from the speed data or the acceleration data of the MR presenting apparatus received from the second measuring section 4, and sends a control signal to the correcting optical system 6 on the basis of the calculated value. The amount of control for the correcting optical system 6 is determined so as to eliminate the "dynamic registration error" of the real-space scene and virtual-space image at the observer's viewpoint. This will be described further in detail.

Figure 7:
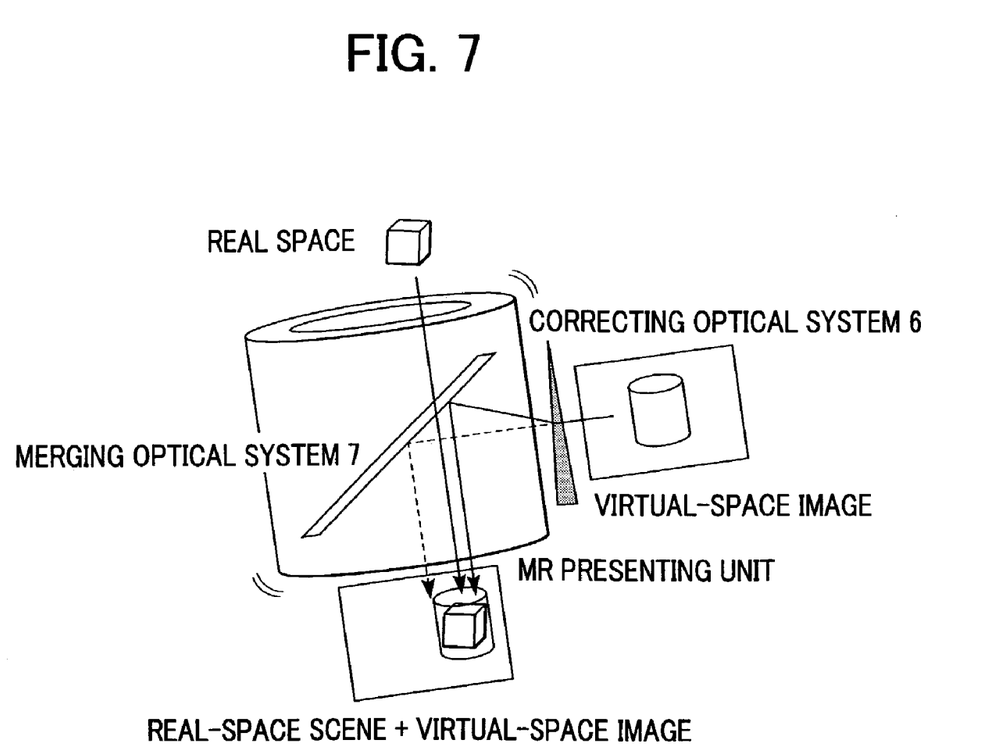
FIG. 7 illustrates a configuration in which a "dynamic registration error" is eliminated by the second embodiment of the invention.

When the MR presenting apparatus is moving, it takes some time for this movement to be reflected in the virtual-space image data generated by the virtual-space image generating section 2. As a result, a registration error, as shown in FIG. 2, of the real-space scene and the virtual-space image at the observer's viewpoint is produced. The correcting optical system 6 causes refraction of the path of the image light incident from the virtual-space image display section 3 in the vertical and the horizontal directions of the MR presenting apparatus. An appropriate refraction angle would eliminate the registration error as shown in FIG. 7. The refraction angle depends upon the amount of change (amount of deformation or amount of movement) of the correcting optical system 6. The amount of change of the correcting optical system 6 is controlled by the correcting optical system control section 5. The amount of control is determined in response to the speed or acceleration of the MR presenting apparatus measured by the second measuring section 4. For example, when the second measuring section 4 measures the rotation angular speed of the MR presenting apparatus, the correcting optical system control section 5 determines an amount of control so that the virtual-space image at the observer's viewpoint moves by amounts calculated by the following Formulae (3) and (4):

$$Vx = L \times t1 \times \omega x \quad (3)$$

$$Vy = L \times t1 \times \omega y \quad (4)$$

where,
Vx: Amount of displacement of the virtual-space image in the horizontal direction of the MR presenting apparatus;
Vy: Amount of displacement of the virtual-space image in the vertical direction of the MR presenting apparatus;
L: Distance between a previously assumed rotation center of the MR presenting apparatus and the observer's viewpoint;
$\omega x$: Angular rotation speed of the MR presenting apparatus around the vertical axis;
$\omega y$: Angular rotation speed of the MR presenting apparatus around the horizontal axis; and
t1: Average time required from the moment when measuring the position and orientation of the MR presenting apparatus to the moment when displaying the virtual-space image; and as in the first embodiment, t1 represents the sum of the time required from the start of measurement by the first measuring section up to output of the measurement data and the time required for the virtual space image generating section 2 to generate the virtual space image data.

In Formulae (3) and (4), L×t1 is a constant. It is therefore possible to accomplish calculation of these Formulae in a very short period of time. Therefore, the "dynamic registration error" occurring as a result of movement of the MR presenting apparatus during this processing can substantially be disregarded. If the virtual space image moves by amounts available from Formulae (3) and (4) at the observer's viewpoint, the "dynamic registration error" of the real space scene and the virtual-space image would be eliminated.

When there is a difference between an actual time and the average time required from the moment of measurement of the position and orientation of the observer's viewpoint by the first measuring section 1 to the moment of display of the virtual space image, the "dynamic registration error" of the real space scene and the virtual-space image cannot completely be eliminated with movement by an amount obtained from Formulae (3) and (4). This problem can be solved by minimizing the difference between the actual time and the average time required from the moment of measurement of the position and orientation of the observer's viewpoint by the first measuring section 1 through the moment of display of the virtual space image by configuring the virtual space image generating section 2 with a high-performance equipment.

While an amount of control for the correcting optical system 6 is determined by use of Formulae (3) and (4) in this case, other formulae may be used. For example, the formulae may assume that t1 in Formulae (3) and (4) is "an actual time required from the moment of measurement of the position and orientation of the MR presenting apparatus to the moment of display of the virtual-space image". The "dynamic registration error" of the real-space scene and the virtual-space image is thus completely eliminated.

In other applicable formulae, $\omega x$ and $\omega y$ may be expressed by means of $\omega x(t)$ and $\omega y(t)$ and the variable t representing the time on the basis of integral values of speeds $\omega x$ and $\omega y$ and a predicted value by a Kalman filter, and "t1×$\omega x$" in Formula (3) and "t1×$\omega y$" in Formula (4) are replaced by "$\int t \times \omega x(t)$" and "$\int t \times \omega y(t)$", respectively (the range of integration covers the time from the moment of measurement of the position and orientation of the MR presenting apparatus to the moment of display of the virtual-space image, or the average time required from the moment of measurement of the position and orientation of the MR presenting apparatus to the moment of display of the virtual space image).

In step S22, the correcting optical system 6 changes (is deformed or moved) in response to a control signal received from the correcting optical system control section 5. This change causes refraction of the image light incident from the virtual space image display section 3.

In step S40, the merging optical system control section 8 calculates an amount of control for the merging optical system 7 from the speed data or the acceleration data of the MR presenting apparatus received from the second measuring section 4, and sends a control signal to the merging optical system 7 on the basis of the thus calculated value. The merging optical system 7 is controlled so that the paths of the external light incident from the real space and the image light incident from the virtual space image display section 3 after passing through the correcting optical system 6 are adjusted, and a merged light of the both is incident properly on the observer's viewpoint.

In step S50, the virtual-space image display section 3 displays the virtual-space image data in the form of an image. The thus displayed image light is incident on the correcting optical system 6, passes through the merging optical system 7, and is projected onto the observer's viewpoint. Simultaneously, the external light from the real space is also incident on the merging optical system 7, and projected onto the observer's viewpoint. The change of the correcting optical system 6 eliminates the "dynamic registration error" of the real space scene and the virtual-space image at the observer's viewpoint.

When the real space scene and the virtual-space image are projected onto the observer's viewpoint, the virtual-space image which should originally be incident perpendicularly on the observer's viewpoint is diagonally incident on the observer's viewpoint, resulting in a distorted image. A longer optical path between the correcting optical system 6 and the observer's viewpoint permits minimization of the refraction angle of the virtual-space image necessary for correction, and the distortion of the virtual-space image can be disregarded.

The above-mentioned second embodiment has covered a case where the invention is embodied as a telescopic MR presenting apparatus. The invention may also be embodied in the form of a head-mounted type MR presenting apparatus (head-mounted display).

There is conceivable an embodiment worked out by combining the first embodiment and the second embodiment. More specifically, correction of the "dynamic registration error" may be achieved by providing two correcting optical systems, causing refraction of the external light incident from the real space, and causing refraction of the image light incident from the virtual-space image display section 3.

Third Embodiment

Figure 8:
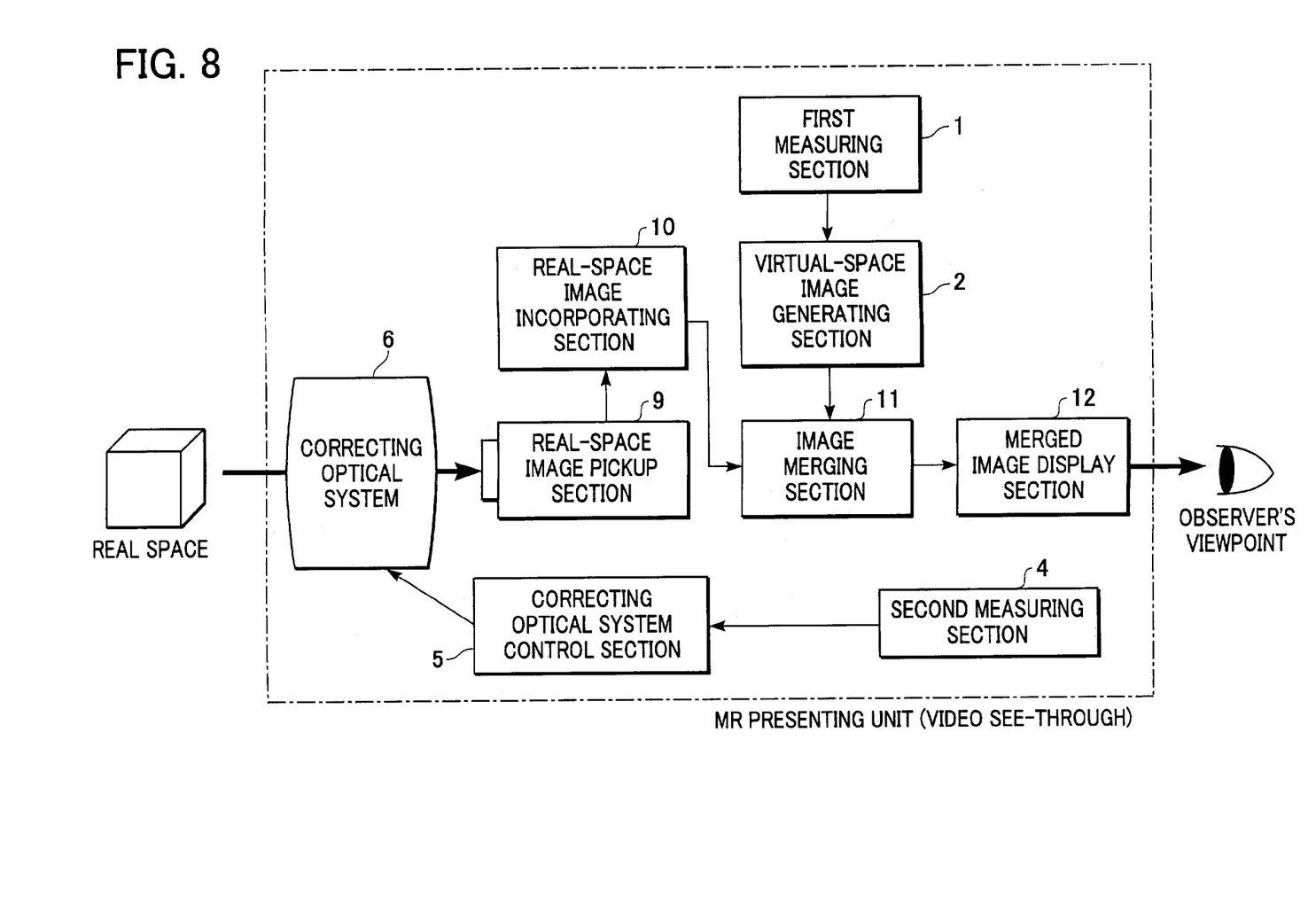
FIG. 8 is a block diagram illustrating a schematic configuration of an MR presenting apparatus of a third embodiment of the invention.

A third embodiment of the present invention will now be described. The third embodiment covers a video see-through type telescopic MR presenting apparatus. FIG. 8 is a block diagram illustrating a schematic configuration of the MR presenting apparatus of the third embodiment of the invention. The third embodiment is substantially the same as the first embodiment except that the configuration achieving the MR presentation based on the optical see-through process is replaced by a configuration achieving an MR presentation based on the video see-through process. The same components as in the MR presenting apparatus of the first embodiment are assigned the same reference numerals.

Reference numeral 1 represents a first measuring section which comprises a magnetic sensor (a magnetic transmitter fixed in the real space and a magnetic tracker attached to the MR presenting apparatus or the like). The first measuring section 1 measures the position and orientation of the viewpoint of the real-space image pickup section 9 in the real space, and outputs the measured data to a virtual-space image generating section 2. The first measuring section 1 comprises a gyrosensor or the like, may measure only the orientation of the real-space image pickup section 9 in the real space and output the measured data to the virtual-space image generating section 2.

Reference numeral 2 represents the virtual-space image generating section which comprises a computer or the like. The virtual space image generating section 2 receives position data and orientation data of the viewpoint of the real-space image pickup section 9 from the first measuring section 1, and generates, from these data, virtual-space image data in response to these data. When receiving only the orientation data of the viewpoint of the real space image pickup section 9 from the first measuring section 1, the virtual-space image generating section 2 generates, from the position data of the predetermined viewpoint of the real-space image pickup section 9 and the received orientation data, corresponding virtual-space image data. This virtual-space image data is for merging with real-space image data which is picked up by the real-space image pickup section 9 and incorporated by a real-space image incorporating section 10, and may include character information for explaining a scene currently in sight, or may be image data simulating a state of the scene in sight in which virtual buildings are built. The generated image data are sent to an image merging section 11.

Reference numeral 4 represents a second measuring section which comprises an acceleration sensor or a gyrosensor. The second measuring section 4 measures the speed or acceleration of the MR presenting apparatus in a real space, and outputs the measurement result to the correcting optical system control section 5. The second measuring section 4 may be one which measures the parallel displacement speed, or one which measures the angular rotation speed, or one which measures both. The second measuring section 4 may be one which measures the parallel displacement acceleration, or one which measures the rotation angular acceleration, or one which measures both. The second measuring section 4 may be identical with the first measuring section 1. In this case, the measuring section which measures the position and orientation of the MR presenting apparatus simultaneously measures also the speed or acceleration of the MR presenting apparatus. The MR presenting apparatus has a simpler construction.

Reference numeral 5 represents the correcting optical system control section which comprises a microcomputer or the like. The correcting optical system control section 5 calculates an amount of control for the correcting optical system 6 from the speed data or the acceleration data of the MR presenting apparatus received from the second measuring section 4, and sends a control signal to the correcting optical system 6 on the basis of the thus calculated value.

Reference numeral 6 represents the correcting optical system which comprises a variable angle prism or the like. The correcting optical system 6 causes refraction of an external light incident from the real space by deforming or moving in response to a control signal sent from the correcting optical system control section 5.

The second measuring section 4, the correcting optical system control section 5, and the correcting optical system 6 are applications of a vibration-proof technique as applied to an image capture apparatus having a regular blur-correcting function.

Reference numeral 9 represents the real space image pickup section which comprises a camera or the like. The real space image pickup section 9 captures a real-space such as an outdoor landscape, and outputs the image thus captures as real-space image data to the real-space image incorporating section 10.

Reference numeral 10 represents the real-space image incorporating section which comprises a video capture card or the like. The real-space image incorporating section 10 converts the real-space image data sent from the real-space image pickup section 9 into a form suitable for an image merging section 11, and outputs the result of conversion to the image combining section 11.

Reference numeral 11 represents the image merging section which comprises a computer or the like. The image merging section 11 merges the virtual-space image data sent from the virtual-space image generating section 2 with the real-space image data sent from the real-space image incorporating section 10, and outputs the merged image data to a merged image display section 12.

Reference numeral 12 represents the merged image display section which comprises a liquid crystal display or the like. The merged image display section 12 displays merged image data sent from the image merging section 11. The light of this display is incident at the observer's viewpoint.

Figure 9:
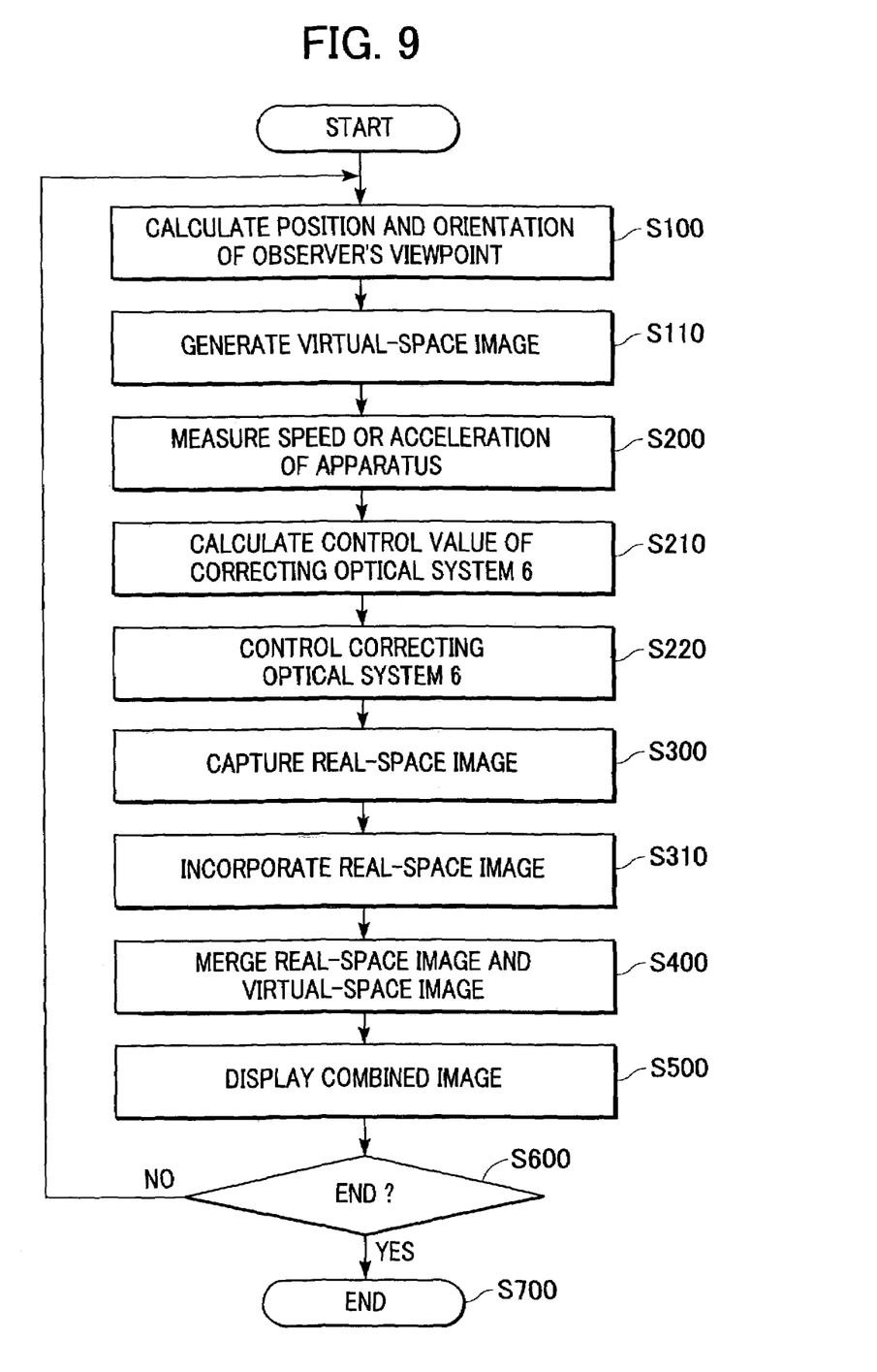
FIG. 9 is a flowchart illustrating the processing procedure of the third embodiment of the invention.

Control of this embodiment having the above-mentioned configuration will now be described. FIG. 9 is a flowchart illustrating the processing procedure in the third embodiment of the invention.

In step S100, the first measuring section 1 measures the position and orientation of the viewpoint of the real-space image pickup section 9, or only the orientation thereof. When only the orientation is measured, previously retained position data is used as a position data for the real-space image pickup section 9.

In step S110, the virtual-space image generating section 2 receives the position data and the orientation data of the viewpoint of the real-space image pickup section 9, and generates virtual-space image data in response to these data.

In step S200, the second measuring section 4 measures the speed or acceleration of the MR presenting apparatus. The term speed as herein used shall mean a parallel moving speed, or a angular rotation speed, or both. The term acceleration as herein used shall mean a parallel moving acceleration, or an angular rotation acceleration, or both. The parallel moving speed and the parallel moving acceleration are determined by measuring vertical-direction and horizontal-direction components of the MR presenting apparatus. In determining the angular rotation speed and the angular rotation acceleration, the components around the vertical axis and around the horizontal axis of the MR presenting apparatus are measured.

In step S210, the correcting optical system control section 5 calculates the amount of control for the correcting optical system 6 from the speed data or the acceleration data of the MR presenting apparatus received from the second measuring section 4, and sends a control signal to the correcting optical system 6 on the basis of the thus calculated value. The amount of control for the correcting optical system 6 is determined so as to eliminate the "dynamic registration error" occurring when merging the real-space image data output by the real-space image incorporating section 10 with the virtual-space image data output by the virtual-space image generating section 2. This will be described further in detail.

When the MR presenting apparatus is moving, if the timing of shooting of the real space by the real-space image pickup section 9 and the timing of measuring the position and orientation of the real-space image pickup section 9 by the first measuring section 1 are not combined, a "dynamic registration error" of the real-space image and the virtual-space image is produced. The correcting optical system 6 causes refraction of the path of the external light incident from the real space on the real-space image pickup section 9 in the vertical and horizontal directions of the MR presenting apparatus so as to eliminate this registration error. An appropriate refraction angle ensures elimination of the "dynamic registration error". The refraction angle depends upon the amount of change (amount of deformation or amount of displacement) of the correcting optical system 6. The amount of change of the correcting optical system 6 is controlled by the correcting optical system control section 5. The amount of control is determined in response to the speed or acceleration of the MR presenting apparatus measured by the second measuring section 4. For example, when the second measuring section 4 measures the angular rotation speed of the MR presenting apparatus, the correcting optical system control section 5 determines an amount of control so that the real-space scene moves by amounts derived from the following formulae (5) and (6) on the plane of incidence on the real-space image pickup section 9:

$$R'x = L \times t2 \times \omega x \quad (5)$$

$$R'y = L \times t2 \times \omega y \quad (6)$$

where,

R'x: Amount of displacement of the real-space scene in the horizontal direction of the MR presenting apparatus;

R'y: Amount of displacement of the real-space scene in the vertical direction of the MR presenting apparatus;

L: Distance between a previously assumed rotation center of the MR presenting apparatus and the real-space image pickup section 9;

$\omega x$: Angular rotation speed around the vertical axis of the MR presenting apparatus;

$\omega y$: Angular rotation speed around the horizontal axis of the MR presenting apparatus; and t2: Time difference between the moment of measurement of the position and orientation (or only the orientation) of the real-space image pickup section 9 and the moment of shooting a real-space image by the real-space image pickup section 9.

Since $L \times t2$ is a constant in Formulae (5) and (6), calculation can be accomplished in a very short period of time. The "dynamic registration error" produced along with movement of the MR presenting apparatus during this processing can therefore be substantially disregarded. As a result, the "dynamic registration error" of the real-space image and the virtual-space image can be eliminated by moving the real-space scene by amounts derived from Formulae (5) and (6) on the plane of incidence on the real-space image pickup section 9.

The amount of control for the correcting optical system 6 is determined in the above-mentioned case by use of Formulae (5) and (6). Other formulae are however applicable. For example, in other applicable formulae, $\omega x$ and $\omega y$ may be expressed by means of $\omega x(t)$ and $\omega y(t)$ and a variable t representing the time on the basis of integral values of speeds $\omega x$ and $\omega y$ and a predicted value by a Kalman filter, and "$t2 \times \omega x$" in Formula (5) and "$t2 \times \omega y$" in Formula (6) are replaced by "$\int t \times \omega x(t)$" and "$\int t \times \omega y(t)$", respectively (the range of integration covers the period between the moment of measurement of the position and orientation (or only the orientation) of the real-space image pickup section 9 and the moment of shooting of the real-space image by the real-space image pickup section 9).

In step S220, the correcting optical system 6 changes (is deformed or moved) in response to the control signal received from the correcting optical system control section 5. This change causes refraction of the external light incident from the real space.

The change of the correcting optical system 6 in step S220 is an application of an anti-vibration technique applied to a regular pickup apparatus having a blur-correcting function.

In step S300, the real-space image pickup section 9 shoots the real-space scene incident after passing through the correcting optical system 6. The projected position of the real-space scene thus captured moves along with the change of the correcting optical system 6 occurring in step S220.

When the real-space scene is projected onto the real-space image pickup section 9, the real-space scene which should originally be incident perpendicularly on the real-space image pickup section 9 is diagonally incident at the real-space image pickup section 9, resulting in a distorted image. A longer optical path between the correcting optical system 6 and the real-space image pickup section 9 permits minimization of the refraction angle of the external light of the real-space necessary for correction, and the distortion of the real-space scene can be disregarded.

In step S310, the real-space image incorporating section 10 converts the real-space image captured by the real-space image pickup section 9 into a form suitable for the image merging section 11, and outputs the same to the image merging section 11.

In step S400, the image merging section 11 merges the virtual-space image data sent from the virtual-space image generating section 2 with the real-space image data sent from the real-space image incorporating section 10, and outputs the merged image data to the merged image display section 12. The registration error caused by the-difference between the timing of shooting of the real space by the real-space image pickup section 9 and the timing of measurement of the position and orientation of the MR presenting apparatus by the first measuring section 1 is eliminated.

In step S500, the merged image display section 12 displays the merged image. The displayed image light is projected onto the observer's viewpoint.

In step S600, it is checked whether or not the operation of the apparatus is to be discontinued. When discontinuing operation of the apparatus, the system is stopped in step S700, and when not ending the operation, the process goes back to step S100 to repeat the above-mentioned steps.

The aforementioned third embodiment has been described as to a case where the present invention is applied in the form of a telescopic MR presenting apparatus. The invention may be applied in the form of a head-mounted type MR presenting apparatus (head-mounted display).

A registration error caused by a time lag until reflection of the movement of the MR presenting apparatus into the display of the virtual space image by combining the first embodiment and the third embodiment of the present invention, in an MR presenting apparatus capable of being switched over between the optical see-through type and the video see-through type.

Other Embodiments

The object of the present invention is achieved also by supplying a recording medium recording software for realizing the functions of the aforementioned embodiments of the invention in a system or an apparatus, and causing a computer (or a CPU or an MPU) of such a system or an apparatus to read out the program code stored in the recording medium for execution. In this case, the program code itself read out from the recording medium achieves the functions of the above-mentioned embodiments, and the recording medium storing the program code embodies the present invention. Execution of the program code read out by the computer permits the functions of the aforementioned embodiments to be achieved. In addition, an operating system (OS) running on the computer conducts all or part of the actual processes on the basis of the instructions in the program code, and the above-mentioned functions of the embodiments are thus achieved.

Furthermore, the program code read out from the recording medium may be written into an expansion card inserted into the computer or a memory of an expansion unit connected to the computer, and then a CPU or the like of the expansion card or the expansion unit executes all or part of the actual processes on the basis of the instructions in the program code, thereby achieving the functions of the above-mentioned embodiments. These cases are also included within the scope of the present invention.

Many widely differing embodiments of the present invention can be made without departing from the spirit and scope thereof, and it is to be understood that the invention is not limited to the specific embodiments thereof except as defined in the appended claims.

What is claimed is:

1. A mixed reality presenting apparatus for merging an input real-space image and a generated virtual-space image, comprising:
   a measuring section which measures the orientation of a unit for inputting said real-space image and the speed or acceleration thereof;
   a virtual-space image generating section which generates virtual-space image data on the basis of the measurement result;
   a correcting optical system which corrects a light path of said real-space image;
   a correcting optical system control section which controls said correcting optical system on the basis of said measured speed or acceleration, so that a dynamic registration error is reduced; and
   a merging section for merging said real-space image whose light path is corrected by said correcting optical system and said virtual-space image.

2. A mixed reality presenting apparatus according to claim 1, wherein said measuring section further measures the position of said apparatus.

3. A mixed reality presenting apparatus according to claim 1, wherein said correcting optical system control section adjusts the amount of correction of said correcting optical system in response to the time required for generating the virtual-space image by said virtual-space image generating section.

4. A mixed reality presenting apparatus according to claim 1, wherein an amount of correction of the course of light passing through said correcting optical system is set in response to an average time required for generating the virtual-space image data by said virtual-space image generating section.

5. A mixed reality presenting apparatus according to claim 1, further comprising:
   a real-space image pickup section which picks up external light incident from a real space; and
   a display section which displays a merged image formed by the merging section.

6. An image processing method comprising the steps of:
measuring the orientation of an apparatus for inputting a real-space image and the speed or acceleration thereof;
generating virtual-space image data on the basis of the measurement result;
controlling a correcting optical system which corrects a light path of said real-space image on the basis of said measured speed or acceleration, so that a dynamic registration error is reduced; and
merging said real-space image whose light path is corrected by said correcting optical system and said virtual-space image.

7. A mixed reality presenting apparatus for merging an input real-space image and a generated virtual-space image, comprising:
a measuring section which measures the orientation of a unit for inputting said real-space image and the speed or acceleration thereof;
a virtual-space image generating section which generates virtual-space image data on the basis of the measurement result;
a virtual-space image display section which displays the generated virtual-space image based on the generated virtual-space image;
a correcting optical system which corrects a light path of said displayed virtual-space image;
a correcting optical system control section which controls said correcting optical system on the basis of said measured speed or acceleration, so that a dynamic registration error is reduced; and
a merging section for merging said real-space image and said displayed virtual-space image whose light path is corrected by said correcting optical system.

* * * * *